United States Patent

[11] 3,615,860

| [72] | Inventor | Mark J. Terlecke<br>Madison, Wis. |
|---|---|---|
| [21] | Appl. No. | 883,426 |
| [22] | Filed | Dec. 9, 1969 |
| [45] | Patented | Oct. 26, 1971 |
| [73] | Assignee | ESB Incorporated<br>Continuation-in-part of application Ser. No. 772,774, Nov. 1, 1968. |

[54] DRY CELL CONSTRUCTION HAVING A ONE PIECE PLASTIC CLOSURE
6 Claims, 2 Drawing Figs.

[52] U.S. Cl. .................................................. 136/107, 136/102, 136/133, 136/177
[51] Int. Cl. ...................................................... H01n 21/06
[50] Field of Search ........................................... 136/107, 102, 83, 6, 30, 133, 177

[56] References Cited
UNITED STATES PATENTS

| 3,016,414 | 1/1962 | Priebe | 136/107 |
|---|---|---|---|
| 3,168,420 | 2/1965 | Jammet | 136/107 |
| 3,184,341 | 5/1965 | Reilly | 136/107 |
| 3,278,339 | 10/1966 | Reilly et al. | 136/107 |
| 3,345,215 | 10/1967 | Ryhiner et al. | 136/102 |
| 3,357,865 | 12/1967 | Davis et al. | 136/137 |
| 3,376,166 | 4/1968 | Hruden | 136/107 |
| 3,463,669 | 8/1969 | Jammet | 136/107 |

Primary Examiner—Winston A. Douglas
Assistant Examiner—C. F. Lefevour
Attorneys—Alfred J. Snyder, Jr., Robert H. Robinson and Raymond L. Balfour ABSTRACT: A dry cell construction having a one-piece plastic closure covering the open end of the negative electrode can which contains a depolarizer mix and a current collector centrally imbedded in the depolarizer mix. The plastic closure rests on the top edge of the negative electrode can and has a tubular projection extending from the bottom thereof through which the current collector passes. The tubular projection covers the current collector throughout an airspace located above the depolarizer mix. The plastic closure contains at least one venthole extending from its top surface into contact with the airspace above the depolarizer mix and at least one groove in the top surface of the closure extending from the outer edge of the closure into contact with the airspace between the terminal cap on top of the current collector and the plastic closure. It is preferred that the plastic closure have a plurality of ventholes and grooves which are offset from each other. The cell construction of this invention is particularly adapted for rechargeable dry cells which utilize a depolarizer mix containing an azodicarbonamide depolarizer material.

PATENTED OCT 26 1971 3,615,860

INVENTOR.
Mark J. Terlecke

DRY CELL CONSTRUCTION HAVING A ONE PIECE PLASTIC CLOSURE

CONTINUATION-IN-PART APPLICATION

This patent application is a continuation-in-part of pending U.S. Pat. application, Ser. No. 772,774 filed on Nov. 1, 1968 in the names of Duane M. Larsen and Mark J. Terlecke from which this sole patent application is derived as a result of a requirement for restriction made in said earlier filed joint patent application. I hereby claim priority for all subject matter disclosed in said prior application which is also disclosed and/or claimed in this application.

BACKGROUND OF THE INVENTION

The conventional construction of a flashlight-type cell involves a zinc anode can with a depolarizer mix filling most of the can and having a carbon rod in the center as a current collector for the depolarizer mix. The cell is sealed by a soft asphaltic pitch and a metal cap which fits over the carbon rod and serves as the positive terminal. An airspace is provided above the depolarizer mix and below the pitch to permit the collection of gases and cell exudate. The gases are formed during discharge of the cell and means have to be provided for venting the gases before too large a pressure develops within the cell. If the cell is rechargeable, more gases may be evolved during charging and it becomes more important that the gases be vented properly.

There are disadvantages in the conventional cell construction. In particular, several assembly stations are required for placing a seal washer down into the cell, pouring the asphaltic pitch onto the seal washer, placing a vent washer on top of the pitch and finally placing the terminal cap on top of the cell and locking it in place. The vent washer on top of the pitch is used to prevent the cap from becoming embedded in the pitch to form a gastight seal which could prevent venting.

The use of the asphaltic pitch makes the sealing operation dirty and somewhat expensive due to the several steps required in the operation. In addition, the soft pitch does at times squeeze up around the top washer and cause a gastight seal around the terminal cap edge. Another disadvantage is that high temperatures may soften the pitch and cause it to leak from the cell container.

SUMMARY OF THE INVENTION

The overall purpose of this invention is to provide a one-piece plastic closure for a dry cell wherein the closure replaces several components of the conventional cell and is capable of sealing the cell, venting gases from the cell and insulating the carbon rod in the cell airspace. In particular, an object is to use the one-piece plastic closure in a rechargeable cell having an organic depolarizer mix.

Another object of the invention is to achieve a cost saving in the assembly of a dry cell by replacing several components requiring separate assembling steps and using a one-piece plastic closure which can be easily incorporated into the cell construction.

The one-piece plastic closure of this invention comprises a circular piece having a tubular projection in its center for fitting down over the carbon rod and a ribbed edge for providing a good press fit against the inside walls of the negative electrode can. Holes are provided in the plastic closure for venting gases together with grooves in the top surface which serve as vent paths for the gases to escape from beneath the cell terminal cap.

DESCRIPTION OF THE PREFERRED EMBODIMENT

Figure 1:
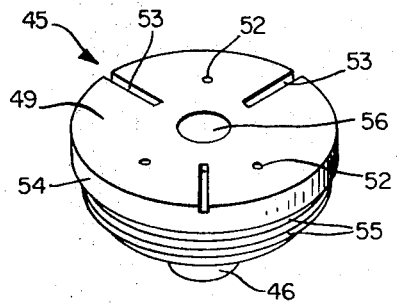
FIG. 1 is a drawing of a one-piece plastic closure of this invention.
Figure 2:
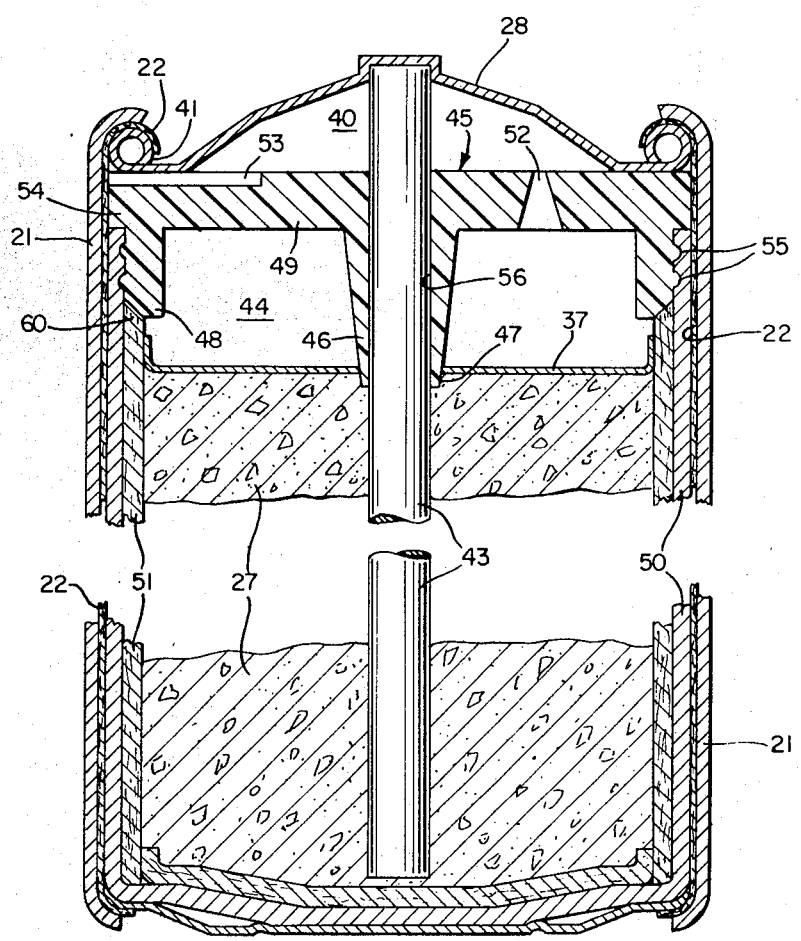
FIG. 2 is a drawing in section of a cell using the closure of this invention.

Referring to FIG. 1 the one-piece plastic closure 45 is shown in perspective. The closure has a flat circular top 49 with an opening 56 in the center and corresponding tubular projection 46. Several ventholes 52 are provided in the top, together with several grooves 53 which are molded into the upper surface of the top 49. These grooves extend to the edge of the top and act as channels, permitting gas which passes through the ventholds from the cell interior to reach the outer edge of the plastic closure. Referring briefly to FIG. 2, the metal terminal cap 28 is shown pressed against the closure 45 at the outer edges where the cell casing 21 is crimped over the rolled edge 41 of the terminal cap. With the amount of pressure exerted by the crimping force, it would be possible to press the terminal cap down onto the closure so that a seal could effectively exist around the outer edge 54 of the closure. If there were such a seal then gases entering the space 40 under the cap would not be able to escape and the cell would not be vented. However, by molding grooves, as shown at 53 in FIG. 1, the formation of such a seal is prevented and gases are able to escape as described above.

Referring to FIG. 1 again, the grooves 53 are shown offset from the ventholes 52. This construction is preferred in order to deter any electrolyte which might in some way pass up through the ventholes and reach the top 49 of the closure from getting into the grooves and leaking out beneath the terminal cap 28. By offsetting the grooves 53 from the holes 52, a vent path for gases is provided while a direct leakage path for any stray electrolyte present on the top 49 of the plastic member is avoided. Although this is the preferred arrangement of the holes and grooves, it is clearly recognized that the number and arrangement of the holes and grooves could be varied, and this invention is not restricted to the plastic closure illustrated in FIG 1. In fact each hole could actually communicate directly with each groove to accomplish venting of the cell. Also, there could be just one hole and one groove although a plurality of each is desirable. Also, it is possible to put holes in the tubular projection 46 so that gases could flow up inside the tubular projection to the top 49 and then escape around the edge 41 of the terminal cap. If other means for venting the cell are used, then the ventholes and grooves can be eliminated so that the closure serves the dual function of being a sealant and an insulator.

Polyethylene is the preferred material to be used to manufacture this one-piece plastic closure, although other plastics can be used. The closure is shown as being circular which is the shape needed for use in cylindrically shaped cells such as those used in flashlights and similar instruments. Of course, it is contemplated to modify this unitary plastic closure and use it in cells of different shapes and not limit it to use in cylindrically shaped cells.

In FIG. 2 there is shown a partially diagrammatic drawing in section of a cell of this invention. The carbon rod 43 is shown passing through the center of the plastic closure 45 and is surrounded in the airspace 44 by a tubular projection 46 of the plastic closure. The projection 46 is embedded at one end 47 in the depolarizer mix 27 to prevent an electrolyte path from being present at the point where the carbon rod passes through the insulator 37. The plastic closure 45 is pressed down inside the insulator lining 22 and the bottom of the outer edge 54 of the closure rests on the top edge of the zinc can 50 while sidewalls 48 are pressed against the zinc can. The sidewall 48 preferably has ribs 55 around the outside so as to permit a positive-gripping action to take place between the zinc can 50 and the plastic ribs 55. The closure 45 is snapped into place to provide a good mechanical seal between the zinc can and the closure. The bottom edge 60 of the sidewall 48 is beveled so as to retain the laminated separator 51 against the zinc can in the airspace 44.

As can be seen in FIG. 2, no vent washer or sealant is provided since the plastic closure serves the function of these two elements in addition to insulating the carbon rod in the airspace 44 as discussed above. The top 49 of the closure incorporates means for venting the gases as well as replacing the sealant. Venting is accomplished through holes and grooves in the top 49 with one of the holes 52 and one of the grooves 53 being shown in FIG. 2. Gas passes from the interior of the cell up through hole 52 into the space 40 under the cap 28 and flows in the channel formed by groove 53 out to the edge of the rim 54 of the top 49. The gas then escapes to the atmosphere in the area where the rolled edge 41 of the cap is crimped under the casing 21. A paper liner 22 insulates the metallic jacket 21 from the zinc can 50 and the terminal cap 28.

It was briefly mentioned above that the separator 51 is a laminated separator. While this is the preferred separator it is to be understood that any separator can be used which is suitable for the particular electrochemical system involved. The laminated separator is used here because the preferred depolarizer mix is an organic material (azodicarbonamide) which can be recharged. The preferred laminated separator has performed well in preventing zinc growths from contacting the depolarizer mix after repeated cycles.

A preferred separator material comprises using a semipermeable barrier material in combination with an absorbent material, such as a thermoplastic resin which serves as a continuous elastomeric binder matrix for a gelling agent such as a starch-wheat flour mixture, carboxymethyl cellulose, etc. In particular, a separator used successfully in a cell of this invention consists of a laminated construction of a layer of cellophane with a layer of an ethylene/vinyl acetate copolymer, such as Elvax, having therein a gelling agent such as a starch-wheat flour mixture. The cellophane layer, being the semipermeable barrier, is in contact with the depolarizer mix while the Elvax layer is placed against the zinc can. Another laminated separator which has been used consists of a layer of victory paper on a layer of cellophane with the cellophane again in contact with the depolarizer mix while the paper lines the zinc can.

Although the preferred depolarizer mix described here is an organic depolarizer mix, the one-piece plastic closure can readily be used on conventional dry cells and is not limited to use in any particular cell construction, and in particular, it is not limited to use in the rechargeable cell described herein.

The organic depolarizer mix contains a substituted or an unsubstituted azodicarbonamide compound of the type disclosed in U.S. Pat. No. 3,357,865 issued on Dec. 12, 1967 to Stanley M. Davis, Charlotte M. Kraebel and Richard A. Parent. The azodicarbonamide compound is present in the depolarizer mix in an amount ranging from about 5 to about 60 percent by weight of the total mix. These compounds may be generally represented by the formula:

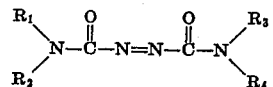

where $R_1$, $R_2$, $R_3$ and $R_4$ may be hydrogen, alkyl of one to eight carbon atoms, mono- and dicarbocyclic aryl or substituted aryl, cyclo-aryl, aralkyl, alkoxyalkyl, cyanoalkyl, haloalkyl, nitroalkyl, alkenyl, and where $R_1$ and $R_2$ and/or $R_3$ and $R_4$, when alkyl, may be joined together through a nitrogen, sulfur or oxygen linkage to form a heterocyclic ring.

The preferred azodicarbonamide compounds are those in which the nitrogen atoms carry an alkyl radical of one to four carbon atoms. In particular, a di-N-butyl azodicarbonamide compound has been successfully used in the depolarizer mix in amounts ranging between 15 to 30 percent by weight of the depolarizer mix. As disclosed in U.S. Pat. No. 3,357,865, it is possible to use the corresponding substituted or unsubstituted biurea and oxidize it by charging the cell in the presence of an appropriate catalyst, thereby forming an azodicarbonamide compound in situ in the cell. Furthermore, mixtures of the azodicarbonamide compounds may be used. The depolarizer mix also contains electrolyte solution and a conductive carbon ingredient, such as graphite, acetylene black or other high surface area carbon blacks. The electrolyte used generally comprises an aqueous solution containing a soluble salt, such as halide salts or mixtures thereof. It is preferred to use a conventional LeClanche electrolyte which comprises an aqueous solution of ammonium chloride and zinc chloride.

Having completely described this invention, what is claimed is:

1. A cell construction comprising, in combination, a negative electrode can open at one end, a bottom insulator in the bottom of said can, a separator lining the vertical wall of said can, a positive electrode comprising a depolarizer mix disposed within said can and separated therefrom by said bottom insulator and said separator, a current collector centrally embedded in said depolarizer mix, a metal terminal cap on top of said current collector and said terminal cap having its outer edge roller over, a top insulator resting on top of said depolarizer mix and located below the top of said can, a one-piece plastic closure covering the open end of said can with the current collector passing through a tubular projection extending from the bottom of said closure and the outer bottom edge of said closure resting on the top edge of said can, said closure being spaced from said top insulator to form an airspace above said depolarizer mix and said tubular projection covering said current collector throughout said airspace with the bottom edge of said tubular projection embedded in said depolarizer mix, said closure having a sidewall projecting downwardly into said airspace near the outer edge of said closure with said sidewall in contact with the inside of said can which projects above said separator so that the inside of said can is completely covered throughout said airspace, an outer metallic jacket housing said cell and separated from said can and terminal cap by an insulator lining, and the upper edge of said metallic jacket crimped upon the rolled edge of said terminal cap so as to compress the outer edge of said terminal cap against the outer edge of the top of said closure.

2. A cell in accordance with claim 1 in which the sidewall of said closure has at least one rib in contact with said negative can.

3. A cell in accordance with claim 1 in which the plastic closure has at least one venthole extending from its top surface to the airspace below said closure and at least one groove in the top surface of said closure extending from the outer edge of said closure into contact with an airspace between said terminal cap and said closure.

4. A cell in accordance with claim 3 in which there are a plurality of ventholes and grooves in the plastic closure, and said ventholes and grooves are offset from each other.

5. A cell in accordance with claim 3 in which the depolarizer mix contains an azodicarbonamide depolarizer material.

6. A cell in accordance with claim 5 in which the negative electrode can is zinc and the separator in contact therewith is a laminated separator comprising a first layer of an absorbent material in contact with said zinc can and a second layer of a semipermeable barrier material in contact with said depolarizer mix.